United States Patent [19]
Campbell et al.

[11] Patent Number: 5,863,673
[45] Date of Patent: Jan. 26, 1999

[54] POROUS ELECTRODE SUBSTRATE FOR AN ELECTROCHEMICAL FUEL CELL

[75] Inventors: Stephen A. Campbell, Maple Ridge; Juergen Stumper, Vancouver; David P. Wilkinson, North Vancouver; Michael T. Davis, Port Coquitlam, all of Canada

[73] Assignee: Ballard Power Systems Inc., Burnaby, Canada

[21] Appl. No.: 768,650

[22] Filed: Dec. 18, 1996

Related U.S. Application Data

[63] Continuation-in-part of Ser. No. 574,262, Dec. 18, 1995, Pat. No. 5,672,439.

[60] Provisional application No. 60/028,231, Oct. 10, 1996.

[51] Int. Cl.$^6$ .............................. H01M 4/86; H01M 4/88
[52] U.S. Cl. ........................ 429/44; 29/623.1; 502/101
[58] Field of Search ................... 429/44, 40, 34, 429/41; 29/623.1; 502/101; 204/294

[56] References Cited

U.S. PATENT DOCUMENTS

| | | | |
|---|---|---|---|
| 4,237,195 | 12/1980 | Alfenaar | 429/44 |
| 4,377,033 | 3/1983 | Barnes et al. | 29/623.5 |
| 4,442,139 | 4/1984 | Brigham | 427/122 |
| 4,506,028 | 3/1985 | Fukuda et al. | 502/101 |
| 4,517,805 | 5/1985 | Solomon et al. | 502/101 |
| 4,534,845 | 8/1985 | McIntyre et al. | 204/283 |
| 4,647,359 | 3/1987 | Lindstrom | 204/294 |
| 4,743,349 | 5/1988 | Bachot et al. | 204/242 |
| 4,824,508 | 4/1989 | McIntyre et al. | 156/276 |
| 5,672,439 | 9/1997 | Wilkinson et al. | 429/40 |

FOREIGN PATENT DOCUMENTS

| | | |
|---|---|---|
| 0298690 | 1/1989 | European Pat. Off. . |
| 0718903 | 6/1993 | European Pat. Off. . |
| 0 718 903 | 6/1996 | European Pat. Off. . |
| 1467147 | 3/1977 | Germany . |
| 7-296818 | 11/1995 | Japan . |
| WO 89/06055 | 6/1989 | WIPO . |
| WO 92/21156 | 11/1992 | WIPO . |

OTHER PUBLICATIONS

ZOLTEK Corporation: Product Data Sheet, PAEX 30, Low Oxidation Carbon Fabrics, Feb. 1996.

*Primary Examiner*—Stephen Kalafut
*Attorney, Agent, or Firm*—McAndrews, Held & Malloy, Ltd.

[57] ABSTRACT

A porous electrode substrate for an electrochemical fuel cell comprises at least one preformed web having low or poor electrical conductivity. The web contains an electrically conductive filler. A method for preparing a porous electrode substrate for an electrochemical fuel cell comprises the step of filling a preformed web, the web having low or poor electrical conductivity, with an electrically conductive filler.

40 Claims, 4 Drawing Sheets

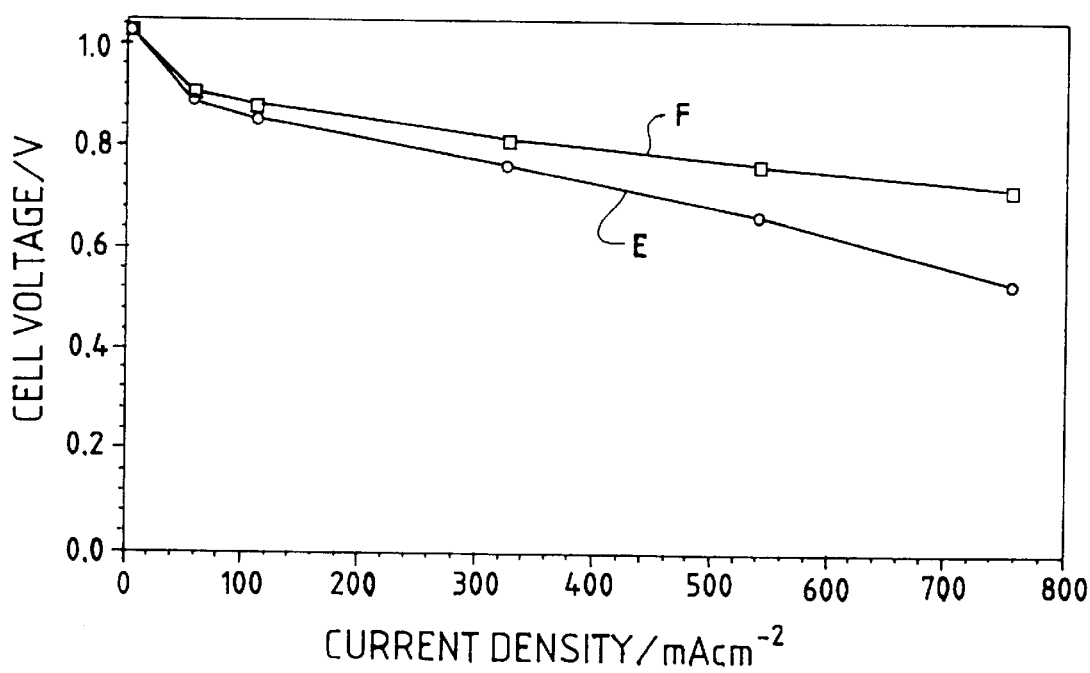

POROUS ELECTRODE SUBSTRATE FOR AN ELECTROCHEMICAL FUEL CELL

CROSS-REFERENCE TO RELATED APPLICATION

This application is a continuation-in-part of U.S. patent application Ser. No. 08/574,262 filed on Dec. 18, 1995, now U.S. Pat. No. 5,672,439 issued Sep. 30, 1997. This application is related to and claims priority benefits from U.S. Provisional patent application Ser. No. 60/028,231 filed Oct. 10, 1996, now abandoned, entitled "Porous Electrode Substrate For An Electrochemical Fuel Cell". The '231 provisional application, incorporated herein by reference in its entirety, describes a porous electrode substrate layer comprising a preformed web having low electrical conductivity and an electrically conductive filler.

FIELD OF THE INVENTION

This invention relates generally to electrochemical fuel cells and, more particularly, to an electrochemical fuel cell with a porous electrode substrate layer comprising a preformed web having low electrical conductivity and an electrically conductive filler.

BACKGROUND OF THE INVENTION

Electrochemical fuel cells convert fuel and oxidant to electricity and reaction product. Solid polymer electrochemical fuel cells generally employ a membrane electrode assembly ("MEA") comprising a solid polymer electrolyte or ion exchange membrane disposed between two electrode layers or substrates formed of electrically conductive sheet material. The electrode substrate has a porous structure which renders it permeable to fluid reactants and products in the fuel cell. The MEA also includes an electrocatalyst, typically disposed in a layer at each membrane/electrode layer interface, to induce the desired electrochemical reaction in the fuel cell. The electrodes are electrically coupled to provide a path for conducting electrons between the electrodes through an external load. At the anode, the fluid fuel stream moves through the porous anode substrate and is oxidized at the anode electrocatalyst. At the cathode, the fluid oxidant stream moves through the porous cathode substrate and is reduced at the cathode electrocatalyst.

In electrochemical fuel cells employing hydrogen as the fuel and oxygen as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product. The anode and cathode reactions in hydrogen/oxygen fuel cells are shown in the following equations:

Anode reaction: $H_2 \rightarrow 2H^+ + 2e^-$

Cathode reaction: $1/2 O_2 + 2H^+ + 2e^- \rightarrow H_2O$

In electrochemical fuel cells employing methanol as the fuel supplied to the anode (so-called "direct methanol" fuel cells) and an oxygen-containing oxidant stream, such as air (or substantially pure oxygen) supplied to the cathode, the methanol is oxidized at the anode to produce protons and carbon dioxide. Typically, the methanol is supplied to the anode as an aqueous solution or as a vapor. The protons migrate through the ion exchange membrane from the anode to the cathode, and at the cathode electrocatalyst layer, oxygen reacts with the protons to form water. The anode and cathode reactions in this type of direct methanol fuel cell are shown in the following equations:

Anode reaction: $CH_3OH + H_2O \rightarrow 6H^+ + CO_2 + 6e^-$

Cathode reaction: $3/2 O_2 + 6H^+ + 6e^- \rightarrow 3H_2O$

In electrochemical fuel cells, the MEA is typically interposed between two separator plates or fluid flow field plates (anode and cathode plates). The plates typically act as current collectors and provide support to the MEA. Fluid flow field plates typically have channels, grooves or passageways formed therein to provide means for access of the fuel and oxidant streams to the porous anode and cathode layers, respectively.

The porous electrode substrate material is electrically conductive to provide a conductive path between the electrocatalyst reactive sites and the current collectors. Materials commonly used as electrode substrate materials in solid polymer electrochemical fuel cells include:

(a) carbon fiber paper;
(b) woven carbon fabric—optionally filled with carbon particles and a binder;
(c) metal mesh or gauze—optionally filled with carbon particles and a binder.

Thus typical electrode substrate materials are preformed, highly electrically conductive, macroporous sheet materials which may contain a particulate electrically conductive material and a binder.

For electrode substrates comprising a macroporous sheet material (hereinafter referred to as a "web") filled with electrically conductive materials, the web need not be highly electrically conductive and in fact may be an electrical insulator. Electrode substrates which are made from filled, poorly electrically conductive webs have performance characteristics in fuel cells approaching those of conventional substrates. However, the use of preformed webs which are made from poorly conducting or insulating materials in the electrode substrate can offer offsetting advantages such as reduced cost, improved chemical compatibility and resistance to degradation and corrosion in fuel cell operation, improved mechanical properties including strength, durability and dimensional stability, and improved manufacturability.

SUMMARY OF THE INVENTION

A porous electrode substrate for an electrochemical fuel cell comprises at least one preformed web having low electrical conductivity, the web containing an electrically conductive filler.

In one embodiment the porous electrode substrate comprises at least two preformed webs, and the substrate is a multi-layer structure.

The web comprises a macroporous sheet material, such as, for example a woven fabric, a non-woven fabric, or a mesh (a continuous sheet of substantially non-porous material which has been perforated). "Macroporous" as used herein indicates that the web has pores or voids therein which preferably have dimensions greater than approximately $10^{-4}$ m. The bulk porosity of the web is preferably greater than 60% and more preferably greater than 80%.

In a preferred embodiment the web is a non-woven fabric comprising carbon fibers and a binder. Examples of suitable low conductivity carbon fiber mats include non-graphitized materials, such as those available from Technical Fibre Products, Kendal, UK in the Optimat 203 Series.

The web having low electrically conductivity may be an electrical insulator. In a first preferred embodiment the preformed web comprises glass fibers, for example, the web is a non-woven glass fiber mat. In a second preferred embodiment the preformed web consists essentially of a polymeric material. Preferred polymeric materials include polyolefins such as, for example, polyethylene or polypropylene, nylon and polyparaphenylene terephthalamide (Kevlar®). A particularly preferred polymeric material is polytetrafluoroethylene (PTFE).

In one embodiment of a porous electrode substrate for an electrochemical fuel cell, the substrate comprising at least one preformed web having low electrical conductivity containing an electrically conductive filler, the electrically conductive filler does not comprise electrocatalyst for promoting the electrochemical reaction in the fuel cell. In this embodiment, the electrocatalyst necessary in a solid polymer fuel cell MEA is typically disposed at the interface of the membrane electrolyte and porous electrode substrate, for example, by deposition on the surface of the membrane electrolyte and/or on the surface of the electrode substrate.

In an alternative embodiment of a porous electrode substrate the electrically conductive filler comprises electrocatalyst for promoting the electrochemical reaction in the fuel cell. In a preferred aspect of this embodiment the electrically conductive filler further comprises an ionomer.

In another embodiment of a porous electrode substrate, the electrically conductive filler comprises a catalyst for promoting a chemical reaction (other than the electrochemical fuel cell reaction), such as, for example, selective oxidation of carbon monoxide.

Preferred non-catalytic components of the filler include carbon particles, such as carbon blacks or graphite particles, and boron carbide. These and other particulate components of the filler may be various forms including powders, flakes and fibers.

Preferably the electrically conductive filler comprises a binder to bind particulate components of the filler together and to retain the filler in the web. Polytetrafluoroethylene is a suitable binder.

The composition of the filler and the extent to which the web is filled with the filler is selected so that the electrode substrate is suitably porous and permeable to the fuel cell reactants and products, but has adequate electrical conductivity. The terms "filled" and "filling", as used herein, indicate that a substantial portion of the pores or voids of the web material are to contain the filler material, i.e., some filler is present in the thickness of the web, not just as a surface coating.

A method for preparing a porous electrode substrate for an electrochemical fuel cell comprises the step at least partially filling a preformed web with an electrically conductive filler. The web is of low electrical conductivity or is an electrical insulator.

In one embodiment of the method, perforations are formed in the preformed web prior to the filling step. The size of the perforations is preferably larger than the average pore size of the preformed web.

In another embodiment of the method, the preformed web is coated with a hydrophilic coating prior to the filling step. In yet another embodiment of the method the preformed web is coated with a hydrophobic coating prior to the filling step.

The hydrophobic coating preferably comprises polytetrafluoroethylene.

Coating the preformed web with a hydrophobic or a hydrophilic material can offer advantages, such as, for example, improved water and other fluid transport properties in the electrode substrate which can enhance fuel cell performance. Use of a hydrophobic coating can result in improved electrocatalyst utilization, as there is less tendency for an electrocatalyst ink applied to the surface of the filled substrate to soak into the substrate, and therefore more of the catalyst is retained at the membrane/electrode substrate interface.

Preferably the electrically conductive filler comprises a binder and the method optionally further comprises the step of heat treating the electrode substrate after the filling step.

The temperature at which the electrode substrate is heat treated is preferably selected to be above the softening point of the binder, so that the binder at least partially melts and binds the electrically conductive material together and to the web.

Various techniques may be used to fill the preformed web with electrically conductive filler, including, but not limited to, roll-coating and screen-printing.

In a method of preparing a multi-layer porous electrode substrate the method comprises the steps of:
 (a) filling at least two preformed webs, the webs of low electrical conductivity, with an electrically conductive filler;
 (b) laminating the at least two filled webs together.

Steps (a) and (b) are preferably performed consecutively.

The lamination step may further comprise stacking the at least two filled webs and applying pressure and temperature, whereby a consolidated multi-layer electrode substrate is formed.

BRIEF DESCRIPTION OF THE DRAWINGS

FIG. 9 is a plot of voltage as a function of current density in an electrochemical fuel cell employing, in one test, a cathode substrate made by filling an electrically insulating, expanded PTFE mesh with carbon black and a copolymeric binder and, in a comparative test, a conventional catalyzed carbon fiber paper cathode substrate.

DETAILED DESCRIPTION OF THE PREFERRED EMBODIMENTS

Figure 1:
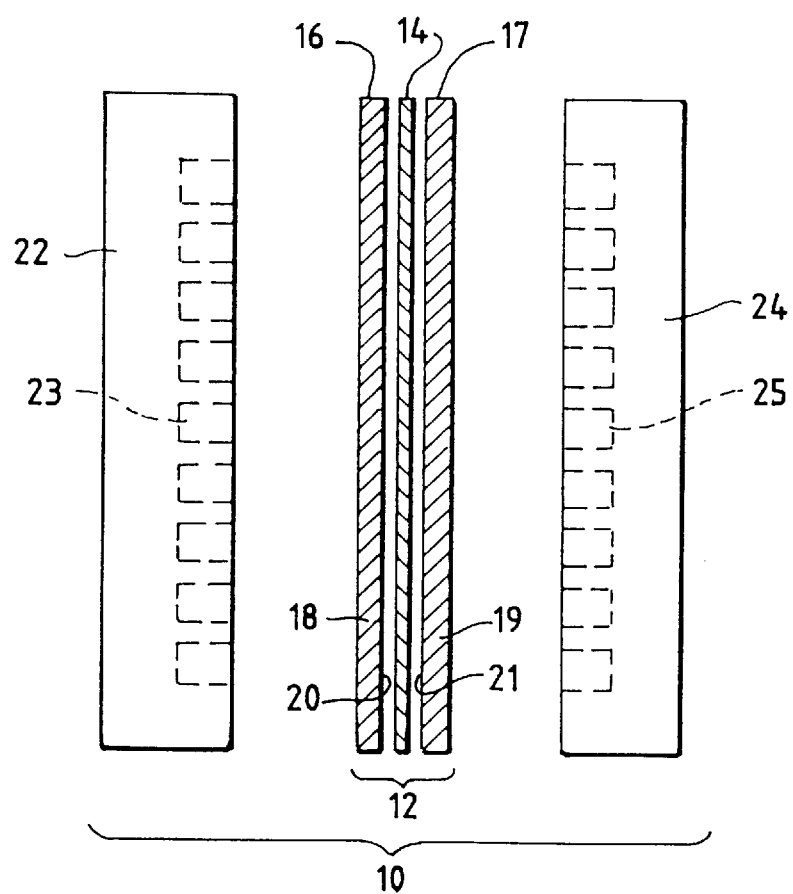
FIG. 1 is an exploded side view of a typical solid polymer electrochemical fuel cell showing an MEA interposed between two flow field plates.

FIG. 1 illustrates a typical solid polymer fuel cell 10. Fuel cell 10 includes an MEA 12 consisting of an ion exchange membrane 14 interposed between two porous, electrically conductive electrode substrates, namely, an anode substrate 16 and a cathode substrate 17. In the illustrated fuel cell, each substrate has a thin layer of electrocatalyst 20 disposed at the interface with the membrane 14. The MEA is interposed between anode flow field plate 22 and cathode flow field plate 24. Anode flow field plate 22 has at least one fuel flow channel 23 formed in its surface facing the anode substrate, and cathode flow field plate 24 has at least one oxidant flow channel 25 formed in its surface facing the cathode substrate. When assembled against the cooperating surfaces of the electrode substrates 16 and 17, channels 23 and 24 form reactant flow field passages for the fuel and oxidant, respectively.

Figure 2A:
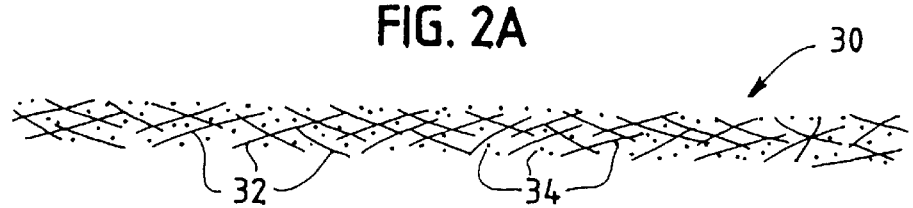
FIG. 2A is a side sectional view of a porous electrode substrate comprising a non-woven, poorly electrically conductive or electrically insulating web containing an electrically conductive filler.

FIG. 2A illustrates a porous electrode substrate 30 comprising a preformed non-woven web shown as a network of interlocking fibers 32, which are optionally held together by a binder (not shown). The web is poorly electrically conductive or is electrically insulating, and contains particulate electrically conductive material 34 and optionally a binder (not shown) to retain the particulate material in the web. The particulate electrically conductive material preferably comprises carbon, and optionally further comprises an electrocatalyst and/or other catalytic material.

Figure 2B:
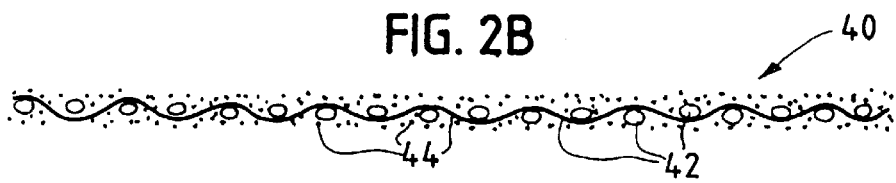
FIG. 2B is a side sectional view of a porous electrode substrate comprising a woven, poorly electrically conductive or electrically insulating web containing an electrically conductive filler.

FIG. 2B illustrates a porous electrode substrate 40 comprising a preformed woven web shown as a fabric of cross-woven fibers 42. The web is poorly electrically conductive or is electrically insulating, and contains particulate electrically conductive material 44 and optionally a binder (not shown) to retain the particulate material in the web.

Figure 3:
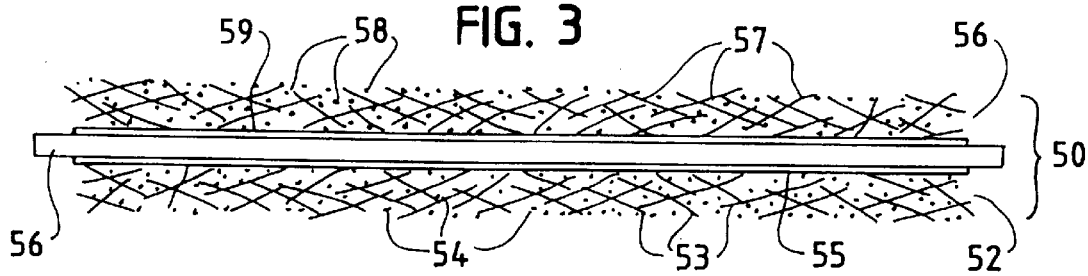
FIG. 3 is a side sectional view of an MEA comprising a membrane electrolyte interposed between two porous electrode substrates, with a layer of electrocatalyst disposed at each membrane/electrode substrate interface.

FIG. 3 illustrates an MEA 50, comprising a membrane electrolyte 51 interposed between an anode substrate 52 and a cathode substrate 56. Anode substrate 52 comprises a preformed non-woven web shown as a network of interlocking fibers 53, which are optionally held together by a binder (not shown). The web is poorly electrically conductive or is electrically insulating, and contains particulate electrically conductive material 54 and optionally a binder (not shown) to retain the particulate material in the web. Similarly cathode substrate 56 comprises a preformed non-woven web shown as a network of interlocking fibers 57, which are optionally held together by a binder (not shown). The web is poorly electrically conductive or is electrically insulating, and contains particulate electrically conductive material 58 and a binder (not shown) to retain the particulate material in the web. In this embodiment the particulate electrically conductive material does not include electrocatalyst. A layer of electrocatalyst 55 and 59 is disposed at the membrane/anode substrate interface and the membrane/cathode substrate interface respectively.

Figure 4:
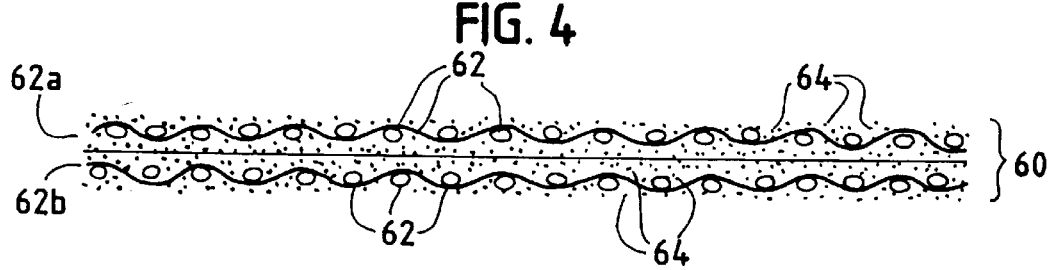
FIG. 4 is a side sectional view of a multi-layer porous electrode substrate comprising two laminated layers, each layer comprising a woven, poorly electrically conductive or electrically insulating web containing an electrically conductive filler.

FIG. 4 illustrates a multi-layer porous electrode substrate 60 comprising two laminated layers 62a and 62b, each layer comprising a preformed woven web shown as a fabric of woven fibers 62. The web is poorly electrically conductive or is electrically insulating, and contains particulate electrically conductive material 64 and optionally a binder (not shown) to retain the particulate material in the web.

This type of laminated multi-layer electrode substrate can offer advantages. It may be possible to improve the electrical conductivity of the substrate because thinner web layers are more easily filled throughout their thickness with the electrically conductive material and binder, and they can then be stacked to give the desired thickness of electrode substrate. Also, the multi-layer substrate can contain layers comprising webs made of different materials or having different structures, and/or layers containing fillers of compositions. Thus, the composition and properties of the substrate can be readily varied in the through-plane direction.

Figure 5:
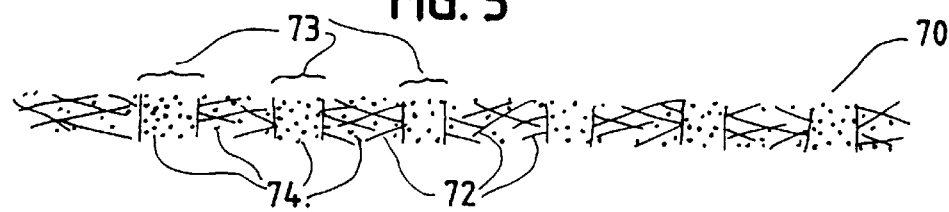
FIG. 5 is a side sectional view of a porous electrode substrate comprising a perforated, poorly electrically conductive or electrically insulating web containing an electrically conductive filler.

FIG. 5 illustrates a porous electrode substrate 70 comprising a perforated preformed non-woven web shown as a network of interlocking fibers 72, which are optionally held together by a binder (not shown), with perforations 73 extending through the thickness of the web. The web is poorly electrically conductive or is electrically insulating. The voids in the web, including the perforations contain particulate electrically conductive material 74 and optionally a binder (not shown) to retain the particulate material in the web.

Perforating the web material prior to filling it with conductive material can increase the electrical conductivity of the final electrode substrate. The diameter of the perforations is preferably larger than the average pore diameter of the web material.

Figure 6:
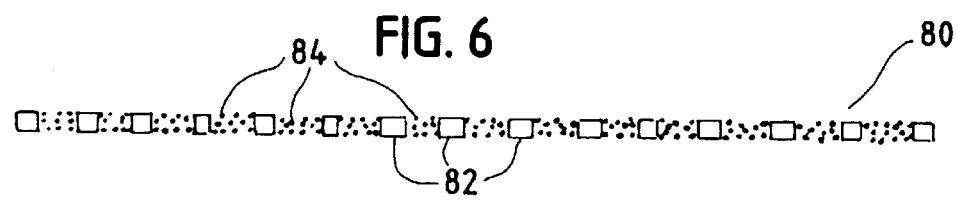
FIG. 6 is a side sectional view of a porous electrode substrate comprising a poorly electrically conductive or electrically insulating web, wherein the web is a mesh containing an electrically conductive filler.

FIG. 6 illustrates a porous electrode substrate 80 comprising a web, wherein the web is a mesh 82. The web contains particulate electrically conductive material 84 and optionally a binder (not shown) within its perforations. The web is poorly electrically conductive or is electrically insulating. Suitable plastic (insulating) mesh materials of this type are available from Exmet Corporation, Naugatuck, Conn., for example PTFE meshes in various mesh sizes from approximately $5*10^{-4}$ m to $2.5*10^{-3}$ m.

The in-plane and through-plane electrical conductivity of the electrode substrate is an important factor in fuel cell performance. Satisfactory electrical conductivity can be obtained for an electrode substrate comprising a low conductivity or insulating web containing an electrically conductive filler. A highly conductive web component is not required.

As used herein, the terms "low electrical conductivity" and "poorly electrically conductive" are used interchangeably. In general, a web material is very poorly conductive when its through-plane resistivity is greater than approximately 10 $\Omega$*cm. Web materials having through-plane resistivities greater than approximately 1 $\Omega$*cm are generally considered to be poorly conductive.

Table 1 shows approximate values for the specific resistance (at 20° C.) of materials commonly used in preformed webs in electrode substrates. Table 2 shows approximate values for the specific resistance (at 20° C.) of some of the electrically insulating materials found to be suitable for use in preformed webs in electrode substrates.

TABLE 1

| Carbon (black) | $10^{-1}$ $\Omega$*cm |
|---|---|
| Carbon (graphite) | $10^{-3}$ $\Omega$*cm |
| Metals | $<10^{-5}$ $\Omega$*cm |

TABLE 2

| Glass | $10^{-13}$ $\Omega$*cm |
|---|---|
| Polyethylene, polypropylene | $>10^{-14}$ $\Omega$*cm |
| Polytetrafluoroethylene | $10^{-18}$ $\Omega$*cm |

Table 3 shows specific resistivity measured in the through-plane direction, using the method described below, for conventional electrode substrate materials (carbon fiber paper and carbon cloth), a non-woven carbon fiber mat (unfilled) and electrode substrates prepared by filling a poorly conducting web or insulating web with an electrically conductive material and binder (Shawinigan carbon black and PTFE binder). Approximate values for the area density of the web, the percentage by weight of PTFE binder in the electrically conductive fill, and the area loading of carbon are included in Table 3. Table 3 illustrates that electrode substrates incorporating a poorly conducting or insulating web can be made which have through-plane electrical resistivity comparable to those of conventional electrode substrate materials. It has been found that the unfilled non-woven carbon fiber mat is not sufficiently conductive to give satisfactory performance in a fuel cell.

TABLE 3

| | Thickness $\mu$m | Area loading of carbon mg/cm2 | PTFE content of fill % wt | Through-plane resistivity $\Omega$*cm |
|---|---|---|---|---|
| Carbon fiber paper | 285 | — | — | 0.17 |
| Carbon cloth (115 g/m$^2$) | 279 | 2.65 | — | 0.21 |
| Non-woven carbon fiber mat (17 g/m$^2$) | 109 | — | — | 2.27 |
| Non-woven carbon fiber mat (17 g/m$^2$) | 79 | 1.7 | 6.7% | 0.76 |
| Glass fiber mat (17 g/m$^2$) | 157 | 5.7 | 6% | 0.56 |
| PTFE mesh (EXMET 2TF6-4/0) | 50 | 3 | 6% | 0.31 |

The through-plane resistivity values reported in Table 3 were determined as follows: samples of the materials were placed between a pair of gold blocks (area 6.17 cm$^2$) with an applied pressure of 41 psi. A current of 3 amps was passed through the material and the voltage drop between the blocks was measured. Both through-plane resistance and contact resistance contribute to the value determined by this method.

The following examples are for purposes of illustration and are not intended to limit the invention. The examples describe the preparation of electrode substrates and compare the results obtained in tests employing those electrode substrates versus conventional electrode substrates in an electrochemical fuel cell.

EXAMPLE 1

Figure 7:
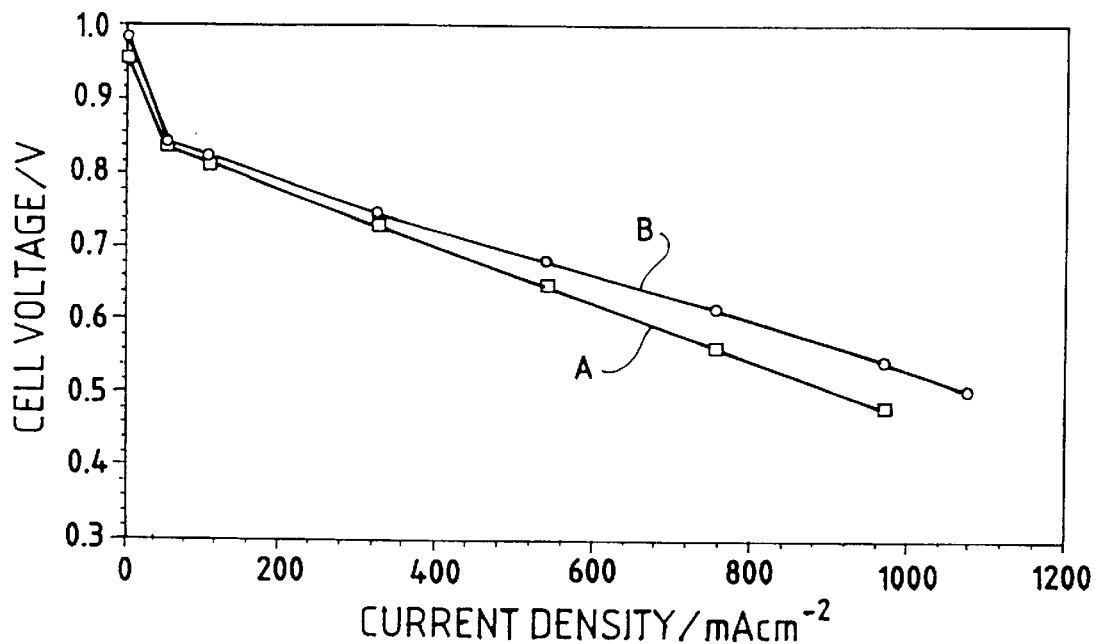
FIG. 7 is a plot of voltage as a function of current density in an electrochemical fuel cell employing, in one test, a cathode substrate made by filling a poorly conducting carbon fiber mat with carbon black and PTFE binder and, in a comparative test, a conventional catalyzed carbon fiber paper cathode substrate.

A porous electrode substrate was prepared as follows: a paste was prepared by mixing Shawinigan carbon and an aqueous suspension of PTFE binder (to give 6% PTFE by weight of solids). The paste was spread on and pressed into the pores of a sheet of non-woven carbon fiber mat (Optimat 203, 17 g*m$^{-2}$ from Technical Fibre Products, Kendal, UK). The substrate was pressed at 500 psi for two minutes, and then placed between two niobium sheets in an oven where the temperature was raised slowly to 340° C. and held for 15 minutes. The substrate contained 6.2 mg*cm$^{-2}$ carbon. A layer of electrocatalyst (40% platinum on carbon) was deposited on one face of the substrate, and the catalyzed substrate was incorporated as the cathode in a consolidated MEA with a conventional anode (electrocatalyst layer on carbon fiber paper) and Nafion 115 ion exchange membrane. The MEA was placed between two flow field plates and tested in a fuel cell assembly. FIG. 7 shows a polarization plot of voltage as a function of current density for the fuel cell employing the MEA prepared as described above (plot A), and for a fuel cell employing an MEA with conventional catalyzed carbon fiber paper electrode substrates (plot B) with approximately the same electrocatalyst loading under substantially the same operating conditions.

EXAMPLE 2

Figure 8:
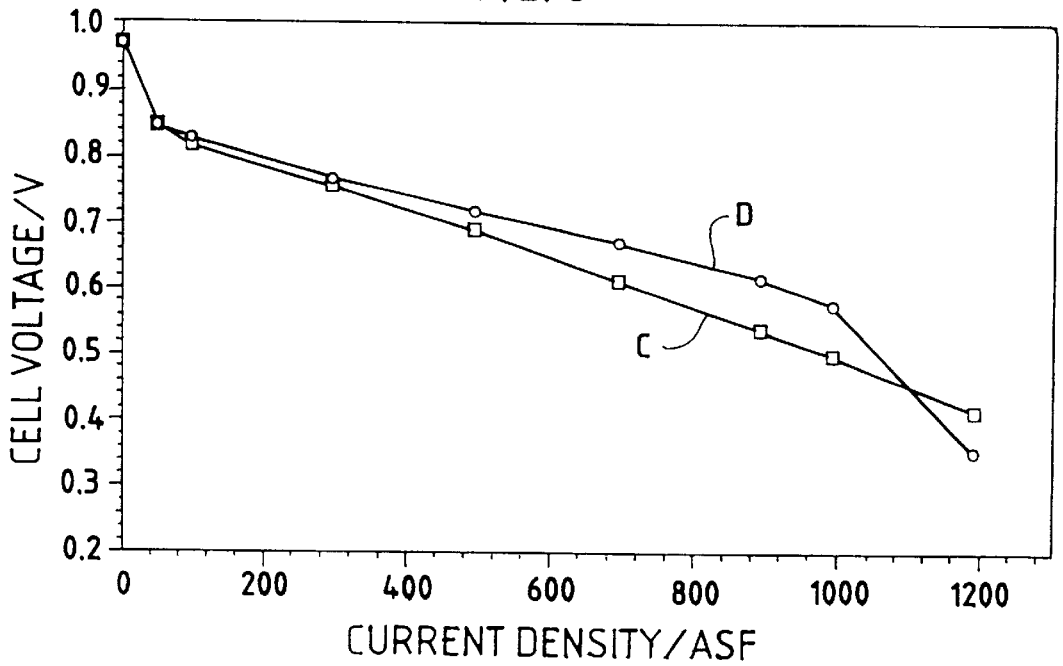
FIG. 8 is a plot of voltage as a function of current density in an electrochemical fuel cell employing, in one test, a cathode substrate made by filling an electrically insulating glass fiber mat with carbon black and PTFE binder and, in a comparative test, a conventional catalyzed carbon fiber paper cathode substrate.

A porous electrode substrate was prepared by filling a sheet of glass fiber mat (17 g*m$^{-2}$ containing 10% by weight polyvinylalcohol binder from Technical Fibre Products) with a paste of Shawinigan carbon and an aqueous suspension of PTFE binder (to give 6% PTFE by weight of solids) as described in Example 1. The substrate contained 4.85 mg*cm$^{-2}$ carbon. A layer of electrocatalyst (40% platinum on carbon) was deposited on one face of the substrate, and the catalyzed substrate was incorporated as the cathode in a consolidated MEA with a conventional anode (electrocatalyst layer on carbon fiber paper) and a proprietary Dow ion exchange membrane (Trade designation XUS 13204.10). The MEA was placed between two flow field plates and tested in a fuel cell assembly. FIG. 8 shows a polarization plot of voltage as a function of current density for the fuel cell employing the MEA prepared as described above (plot C), and for a fuel cell employing an MEA with conventional catalyzed carbon fiber paper electrode substrates (plot D) with approximately the same electrocatalyst loading under substantially the same operating conditions.

EXAMPLE 3

A porous anode substrate containing a catalyst for selective oxidation of carbon monoxide was prepared by filling a sheet of glass fiber mat (17 g*m$^{-2}$ containing 10% by weight polyvinylalcohol binder from Technical Fibre Products) with a paste of a supported platinum catalyst (20% on carbon), Shawinigan carbon and an aqueous suspension of PTFE binder (to give 18% PTFE by weight of solids) as described in Example 1. The substrate contained approximately 0.25 mg*cm$^{-2}$ platinum and 3.9 mg*cm$^{-2}$ uncatalyzed carbon. A layer of electrocatalyst (20% platinum/10% ruthenium on carbon) was deposited on one face on the substrate, and the substrate was incorporated in a consolidated MEA with a conventional cathode (electrocatalyst layer on carbon fiber paper) and a proprietary Dow ion exchange membrane (Trade designation XUS 13204.10). The MEA was placed between two flow field plates in a fuel cell assembly, and gave satisfactory performance (comparable to that of a fuel cell with a conventional catalyzed carbon fiber paper anode substrate with a selective oxidation catalyst layer underneath the electrocatalyst layer) on air-hydrogen, and air-reformate (40 ppm carbon monoxide).

EXAMPLE 4

A porous electrode substrate was prepared as follows: a paste was prepared by mixing Shawinigan carbon and an aqueous suspension of FEP120 binder (a fluorinated ethylene-propylene copolymer available from DuPont, which sinters at a lower temperature than PTFE, to give 40% FEP by weight of solids. A sheet of expanded PTFE mesh (5TF6-4/0 from Exmet Corporation) was prestretched laterally by 18% in the expanded direction, and was then filled as described in Example 1. The substrate was pressed at 500 psi for two minutes, and then placed between two niobium sheets in an oven where the temperature was raised slowly to 275° C. and held for 15 minutes. The substrate contained 8.5 mg*cm$^{-2}$ carbon. A layer of electrocatalyst (40% platinum on carbon) was deposited on one face of the substrate, and the catalyzed substrate was incorporated as the cathode in a consolidated MEA with a conventional anode (electrocatalyst layer on carbon fiber paper) and Nafion 115 ion exchange membrane. The MEA was placed between two flow field plates and tested in a fuel cell assembly. FIG. 9 shows a polarization plot of voltage as a function of current density for the fuel cell employing the MEA prepared as described above (plot E), and for a fuel cell employing an MEA with conventional catalyzed carbon fiber paper electrode substrates (plot F) with approximately the same electrocatalyst loading under substantially the same operating conditions.

Electrode substrates of the present invention are particularly suitable for use in solid polymer electrochemical fuel cells, but may also be used in other types of electrochemical cells and fuel cells.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A porous electrode substrate for an electrochemical fuel cell, said substrate comprising at least one electrically non-conductive preformed web, said at least one web containing an electrically conductive filler.

2. The porous electrode substrate of claim 1 wherein said at least one web consists essentially of a material selected from the group consisting of polytetrafluoroethylene and glass fibers.

3. The porous electrode substrate of claim 1 wherein said at least one web is a mesh.

4. The porous electrode substrate of claim 1 wherein said substrate comprises at least two preformed webs, and said substrate is a multi-layer structure.

5. The porous electrode substrate of claim 4 wherein said substrate comprises a first web and a second web, said first web substantially identical to said second web.

6. The porous electrode substrate of claim 4 wherein said substrate comprises a first web containing a first electrically conductive filler and a second web containing a second electrically conductive filler, said first filler different in composition from said second filler.

7. The porous electrode substrate of claim 2 wherein said at least one web consists essentially of glass fibers.

8. The porous electrode substrate of claim 2 wherein said at least one web is non-woven glass fiber mat.

9. The porous electrode substrate of claim 1 wherein said at least one web consists essentially of a polymeric material.

10. The porous electrode substrate of claim 2 wherein said at least one web consists essentially of polytetrafluoroethylene.

11. The porous electrode substrate of claim 10 wherein said at least one web is polytetrafluoroethylene mesh.

12. The porous electrode substrate of claim 9 wherein said at least one web consists essentially of polyparaphenylene terephthalamide.

13. The porous electrode substrate of claim 9 wherein said at least one web consists essentially of a polyolefin.

14. The porous electrode substrate of claim 1 wherein said electrically conductive filler comprises carbon particles.

15. The porous electrode substrate of claim 1 wherein said electrically conductive filler comprises boron carbide.

16. The porous electrode substrate of claim 1 wherein said electrically conductive filler comprises a catalyst.

17. The porous electrode substrate of claim 16 wherein said catalyst is an electrocatalyst.

18. The porous electrode substrate of claim 17 wherein said filler comprises an ionomer.

19. The porous electrode substrate of claim 1 wherein said filler comprises a binder.

20. The porous electrode substrate of claim 19 wherein said binder comprises polytetrafluoroethylene.

21. An electrochemical fuel cell comprising a pair of electrically conductive separator plates and a membrane electrode assembly interposed therebetween, said membrane electrode assembly comprising a pair of electrodes and an ion exchange membrane interposed therebetween, at least one of said electrodes comprising a porous electrode substrate, said substrate comprising at least one electrically non-conductive preformed web, said at least one web containing an electrically conductive filler.

22. The electrochemical fuel cell of claim 21 wherein each of said separators plates has at least one channel formed therein for introducing a reactant stream to one of said electrodes.

23. A method for preparing a porous electrode substrate for an electrochemical fuel cell, said method comprising the step of filling an electrically non-conductive preformed web with an electrically conductive filler.

24. The method of claim 23 wherein said preformed web consists essentially of a material selected from the group consisting of polytetrafluoroethylene and glass fibers.

25. The method of claim 23 wherein perforations are formed in said preformed web prior to said filling step.

26. The method of claim 23 wherein said preformed web is coated with a hydrophilic coating prior to said filling step.

27. The method of claim 23 wherein said preformed web is coated with a hydrophobic coating prior to said filling step.

28. The method of claim 27 wherein said hydrophobic coating comprises polytetrafluoroethylene.

29. The method of claim 23 wherein said electrically conductive filler comprises a binder.

30. The method of claim 29 further comprising the step of heat treating said electrode substrate after said filling step.

31. The method of claim 23 wherein said filling step comprises roll-coating said preformed web with said electrically conductive filler.

32. The method of claim 23 wherein said filling step comprises screen-printing said electrically conductive filler on to said preformed web.

33. A method of preparing a multi-layer porous electrode substrate, said method comprising the steps of:
  (a) filling at least two electrically non-conductive preformed webs with an electrically conductive filler;
  (b) laminating said at least two filled webs together.

34. The method of claim 33 wherein steps (a) and (b) are performed consecutively.

35. The method of claim 33 wherein step (b) further comprises stacking said at least two filled webs and applying pressure and temperature, whereby a consolidated multi-layer electrode substrate is formed.

36. The porous electrode substrate of claim 1 wherein said at least one web has a polymeric coating applied thereto.

37. The porous electrode substrate of claim 1 wherein said at least one web has a hydrophilic coating applied thereto.

38. The porous electrode substrate of claim 1 wherein said at least one web has a hydrophobic coating applied thereto.

39. A membrane electrode assembly comprising a pair of electrodes and an ion exchange membrane interposed therebetween, at least one of said electrodes comprising a porous electrode substrate, said substrate comprising at least one electrically non-conductive preformed web, said at least one web containing an electrically conductive filler.

40. The membrane electrode assembly of claim 39 wherein said at least one preformed web consists essentially of a material selected from the group consisting of polytetrafluoroethylene and glass fibers.

* * * * *